United States Patent [19]

Laue

[11] 4,215,714
[45] Aug. 5, 1980

[54] VALVE AND METHOD OF MAKING

[76] Inventor: Charles E. Laue, 1041 Pawnee Rd., Wilmette, Ill. 60091

[21] Appl. No.: 911,429

[22] Filed: Jun. 1, 1978

[51] Int. Cl.$^3$ .................. F16K 27/12; F16K 41/18
[52] U.S. Cl. ............................. 137/269; 137/454.5; 137/625.5
[58] Field of Search ............... 137/625.5, 454.5, 269

[56] References Cited

U.S. PATENT DOCUMENTS

| Re. 17,034 | 7/1928 | Bloch | 137/625.5 |
| 3,777,783 | 12/1973 | Beck | 137/625.5 |

FOREIGN PATENT DOCUMENTS 1053971  1/1967  United Kingdom .................. 137/625.5

Primary Examiner—Arnold Rosenthal

[57] ABSTRACT

A refrigeration valve body is formed by brazing front and back segments having front and back ports respectively, the back segment also having a distribution port and a charging port for the reception of pressurized freon gas to charge a related refrigeration system through the back port and the front and distribution ports. The back segment comprises an opening from its back end to the back port. After brazing of the segments a tool is inserted through said opening to dress a seat around the front port. The tool is then removed, and a valve stem and seat assembly is inserted into the opening. This assembly comprises a sleeve threaded into the opening to compress a sealing gasket against a collar which is in turn compressed against a shoulder of the back body segment in the back port. A valve stem is threaded into the sleeve extending through the gasket and collar and comprises a head with oppositely facing seats arranged for line contact with front and back seats around the front port and the front end of the collar, respectively. The collar has a passage from the charging port to the back seat. Preferably all threads are self-locking.

8 Claims, 2 Drawing Figures

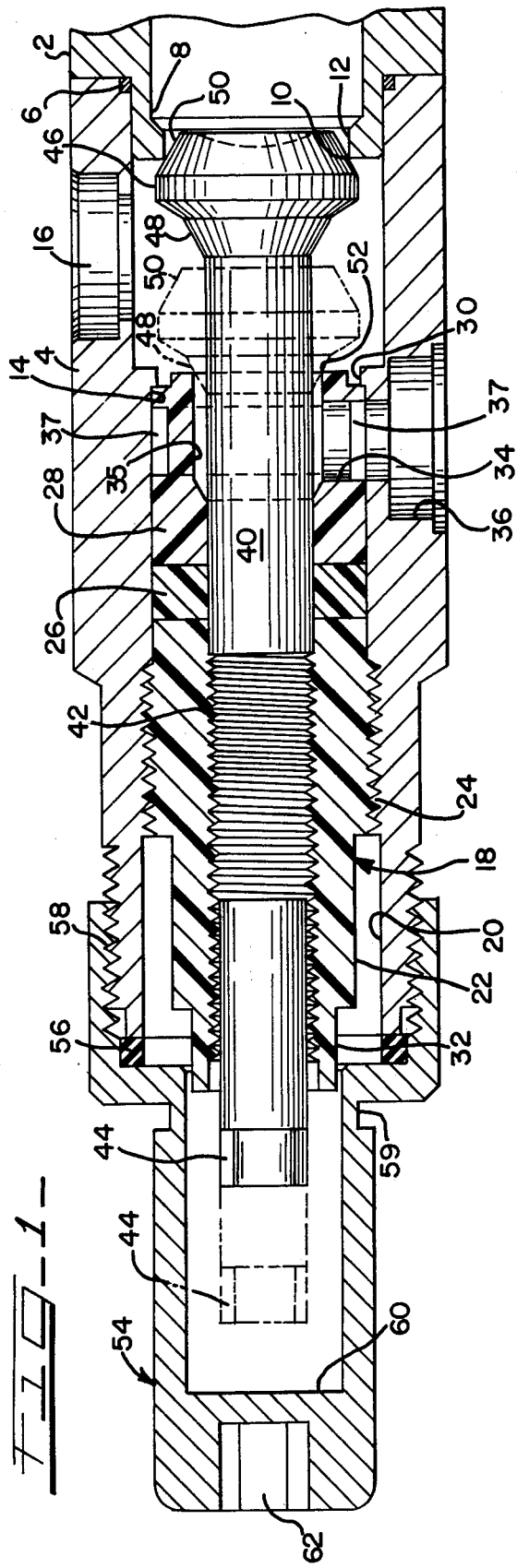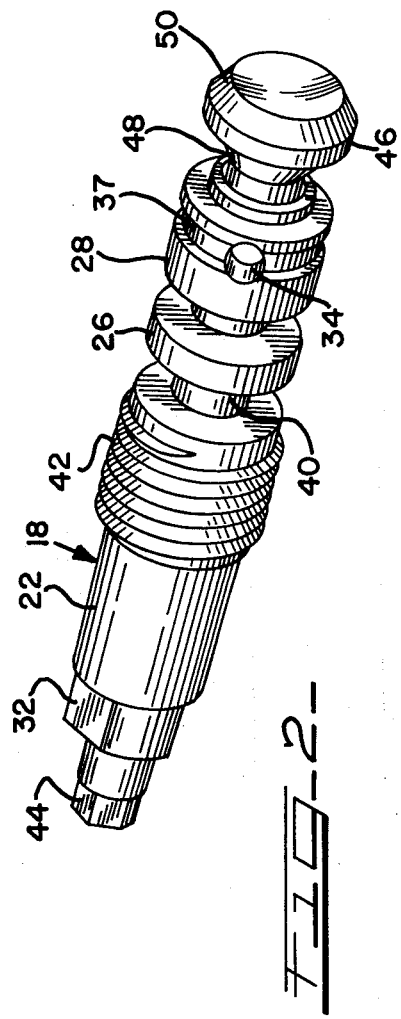

VALVE AND METHOD OF MAKING

This invention relates to valves and more particularly to a refrigeration valve wherein the head of a valve stem comprises oppositely facing seats engageable alternatively with a back port and a front port of a valve body which also comprises a distribution port connected to the front port when it is open by movement of the head either to close the back port or to an intermediate position between the front and back ports whereat a gaseous refrigerant such as freon is forced under pressure from a charging port of the body through the back port into the front and distribution ports. After charging of the refrigeration system through the front and distribution ports, one seat of the head is engaged with the back port to prevent leaking of freon from the refrigeration system during operation thereof. The stem is commonly actuated by threads on the stem mating with threads in an opening of the body extending from the exterior of the body to the back port.

In prior art valves of this type, a common method of assembly has been to mate the threads of a steel stem with one steel body segment containing said stem opening and the back and distribution ports as well as the charging port. The body segment has then been brazed at a temperature of the order of 2000° F. to another steel body segment containing the front port. During the brazing process distortion of the seats on the head and around the front and back ports and fusion of the threads on the stem and body has frequently resulted in the production of defective valves thereby increasing production costs.

Accordingly a primary object of the invention is to devise a novel valve and method of making which will reduce the incidence of defective valves thereby decreasing production costs.

A more specific object of the invention is to devise a novel preassembled and pretested valve stem and seat assembly which may be sealed within the opening and the back port after the valve body has been formed as heretofore described.

Another object of the invention is to afford access to the seat around the front port through the valve body opening before the valve stem and seat assembly has been inserted, thereby permitting the seat around the front port to be dressed by a suitable tool extending through said opening.

Still another object of the invention is to afford line contact between the seats of the valve stem's head and the mating seats of the front and back ports, thereby affording effective sealing engagement at low pressure seating values of the order of ten inch pounds up to about fifty inch pounds as compared with prior art pressure values of the order of up to twenty-five foot pounds or more.

A further object of the invention is to afford a cap for the back end of the valve body in threaded engagement therewith to compress a sealing gasket thereagainst around the novel valve stem and seat assembly, said cap having a wrench socket in its back end wall mateable, upon removal of the cap, with a complementary portion of the valve stem for actuation thereof by an operator's fingers to turn the cap.

Yet another object of the invention is to groove the cap so that it fractures at the groove if the operator applies more than fifty inch pounds of torque to the cap for actuation of the valve stem.

A different object of the invention is to provide a triple seal to prevent leakage through the back port during operation of the refrigeration system, said triple seal comprising: (1) contact of a seat on the stem head with a seat of the valve stem and seat assembly around the back port; (2) a resilient sealing gasket compressed around the stem forwardly of its threads and also compressed against the body, against a sleeve (in threaded engagement with the stem and the body) and against a collar seating against an internal shoulder of the body extending into the back port; and (3) the sealig cap heretofore described.

Yet another object of the invention is to prevent any or all of the threaded connections between the valve parts from loosening under the intense vibration to which a refrigeration system is subjected by the intermittent actuation of a compressor in the system.

The foregoing and other objects and advantages of the invention will become apparent from the following specification and the accompanying drawings wherein:

FIG. 1 is a sectional view along the longitudinal axis of a novel valve embodying a preferred form of the invention, the stem and its head being shown in elevational view in solid lines with the head of the stem seated against the front port, and in phantom lines with the head seated against the back port; and FIG. 2 is a perspective view of a novel valve stem and seat assembly which is part of the valve shown in FIG. 1.

In FIG. 1, the two front and back segments of the steel valve body are shown at 2 and 4, respectively, brazed together by a brazing ring 6 as hereinafter described. The valve body may, of course, be formed of any suitable material such as cast iron or nylon or other suitable plastic but in the preferred embodiment illustrated in the drawing is formed of two machined steel segments 2 and 4, front segments 2 having an annular flange 8 sleeved within segment 4 and defining a front seat 10 around a front port 12. Front segment 2 is broken off as shown in the drawing and is provided with a conventional gas-tight connection (not shown) to connect front port 12 to a compressor (not shown) of a conventional refrigeration system (not shown). Valve segment 4 is the back segment of the valve body containing its back port 14 as hereinafter described and the distribution port 16.

A valve stem and seat assembly generally designated 18 extends through a cylindrical opening 20 of the segment 4. The opening 20 extends from the back end of segment 4 to the back port 14. The assembly 18 comprises a cylindrical sleeve 22 in threaded engagement with segment 4 as at 24 to compress a sealing gasket 26 of teflon or other suitable material against a collar 28 which is in turn compressed against a shoulder defined by projection 30 of body segment 4 projecting into its back port 14. The sleeve 22 at its back end comprises a wrench engaging portion 32.

The collar 28 is bored as at 34 and 35 to afford a passage for freon gas from charging port 36 through back port 14 to distribution port 16 and front port 12 of the segment 4, as hereinafter described.

The assembly 18 also comprises a cylindrical valve stem 40 having its outer diameter in threaded engagement with the inner diameter of the sleeve 22 as at 42. The back end of stem 40 has a wrench engaging portion 44 for a purpose hereinafter described. The stem extends through the gasket 26 and the collar 28, and the front end of the stem 40 comprises a head 46 with oppositely facing seats 48 and 50.

The seat 50 is engageable with seat 10 of body segment 2 as shown in solid lines in FIG. 1, and seat 48 is engageable, as shown in phantom lines in the drawing, with an annular seat 52 at the front end of the collar 28.

The back end of the body segment 4 is sealed by a cap 54 which compresses a sealing gasket 56 engaging the back end of segment 4 upon which the cap 54 is threaded as at 58 to compress the gasket 56. The cap 54 is grooved as at 59 to fracture at that point if more than fifty inch pounds of torque are applied to the cap. The cap 54 has a back wall 60 with a wrench socket 62, which, upon removal of the cap, may be engaged with portion 44 of the stem to rotate it to either position shown in the drawing or to an intermediate position during charging of the front port 12 and the distribution port 16 with freon or other refrigerant gas under pressure, charged under pressure into the charging port 36 as hereinafter described.

In manufacturing the novel valve, the steel valve body segments 2 and 4 are clamped together with the brazing ring 6 in place as shown in the drawing but without the assembly 18 and the cap 54. The clamped segments 2 and 4 are then heated in an oven or furnace to a temperature of the order of 2000° F. until the brazed connection at 6 affords a gas-tight connection between segments 2 and 4.

After the segments have been cooled to ambient temperature, a powerdriven tool (not shown) may be inserted through the opening 20 and back port 14 to dress the seat 10 so that it will afford a line contact, gastight seal around the front port 12 when seat 10 is engaged in line contact by stem seat 50 as hereinafter described. The tool is then withdrawn, and the assembly 18 is assembled to the position shown in the drawing with the head seat 48 in gas-tight line contact with the seat 52 of collar 28 as shown at phantom lines in the drawing. This is called the back seated position of the stem 40 because the back port 14 is sealed against flow of freon gas.

The cap 54 is then threaded onto the segment 4 as at 59 to compress gasket 56 against the back end of the body segment 4.

The valve is shipped in this assembled condition to a user in the field of a refrigeration system. The user then connects the body segment 2 to a compressor for compressing freon flowing under pressure to the port 12, and the user connects the distribution port 16 to a refrigeration system. The user also mounts a conventional one-way valve (not shown) in the charging port 36 to permit flow of freon therefrom through back port 14 into ports 12 and 16. This is accomplished by removing cap 54 and engaging socket 62 with stem portion 44 and rotating the stem 40 until the head 46 is in an intermediate position between the two positions shown in FIG. 1, so that freon gas forced under pressure through charging port 36 may flow into ports 12 and 16 until the system is fully charged. The freon source (not shown) is then disconnected from port 36 and the valve stem 40 is actuated by cap 54 to the position shown at phantom lines in FIG. 1 to seal the back port 14. The cap is then reassembled. The system is then ready for operation by actuation of the compressor.

In the event that the system requires recharging with freon in the field, the cap is again removed and used as a wrench as heretofore described, to move the head 46 to its intermediate position so that the system may be recharged with freon through the charging port 36 whereupon the stem is again actuated to its back seat position as shown in phantom lines in FIG. 1, and the cap 54 is again reassembled.

In the event that the compressor is to be disconnected from the distribution port 16 the cap 54 is removed and used as a wrench to rotate stem portion 44 until the head seat 50 is tightly seated in line contact with seat 10 to seal port 12.

It will be understood that in either position of the head 46 shown in FIG. 1 the maximum torque that can be applied by the cap 54 to the stem portion 44 is of the order of fifty inch pounds to prevent damage to the line contact seats 10 and 50 and the line contact seats 48 and 52. Any torque in excess of that value will cause the cap 54 to fracture at 59 so that the user will be warned not to exceed that torque value. In actual practice the operating instructions for the valve user would recommend about ten inch pounds of torque which can easily be applied by an operator's fingers directly turning the cap 54.

Another feature of the invention is the use of self-locking threads at 24, 42, and 58, so that intensive vibration in the refrigeration system caused by the compressor operation cannot loosen any of these threaded connections. In prior art valves this was accomplished by seating the valve stem along conical seats at torque values of the order of twenty-five foot pounds, whereas according to the present invention embodying line-contact seats such torque values are not only unnecessary but harmful to the seats. Thus the threads at 24 and 42 (and preferably also at 58) are preferably self-locking or interference threads so that the valve head 46 when seated in either position shown in the drawing and the cap 54 cannot be loosened by vibrations in the system.

Another important feature of the invention is that the assembly 18 is completely preassembled and tested with the stem seat 48 back-seated against the collar seat 52 to ensure that no leakage can take place between these seats when the stem is back-seated as shown at phantom lines in FIG. 1. After the assembly has been tested it is then assembled into the opening 20 and sleeve portion 32 is rotated until the collar 28 is seated against the projection 30 by application of a torque force of from ten to fifty inch pounds exerted against sleeve portion 32. The diameter of bore 34 of collar 28 is equal to the width of a groove 37 in the outer diameter of the collar so that the bore 34 need not be aligned with charging port 36 as the collar 28 is seated against the projection 30, although in FIG. 1 the bore 34 is shown in alignment with port 36. The cap 54 is then assembled and the valve is ready for shipment to a user.

It will be understood that the invention is not limited by the exact embodiment of the structure shown which is merely by way of illustration and not limitation as various and other forms of the device will, of course, be apparent to those skilled in the art without departing from the spirit of the invention or the scope of the claims.

For example, the assembly 18 may be releaseably locked in the assembled position (FIG. 1) within opening 20 by means of a conventional bayonet connection between the sleeve 22 and body segment 4 instead of the threads 24 shown in FIG. 1. Or, if desired, the collar 28 which may be formed of brass, nylon, or steel may instead be formed of teflon and thus may be formed integral with gasket 26 which is preferably formed of teflon but if separable from the collar 28 as shown in the drawings may be formed of rubber or any compressible material having adequate density and resiliency to afford a gas-tight seal between the stem 40 and the body segment 4 within its opening 20 when the assembly 18 is mounted in the assembled position of FIG. 1.

What is claimed is:

1. In a refrigeration valve comprising a body having a front port, a back port, a distribution port therebetween, a charging port connected to the back port, and an opening from the back end of the body extending to the back port, a valve stem and seat assembly comprising a sleeve threaded into said opening, a sealing gasket slideably fitted in said opening in gas-tight engagement therewith, a collar in said opening having its front end seated against an internal shoulder on said body at the front of said back port, said assembly also comprising a valve stem in threaded engagement with the interior of said sleeve and having an unthreaded portion slideably fitted in the gasket in gas-tight engagement with its inner diameter, said stem portion extending through the collar and having a head with oppositely facing seats engageable alternatively with mutually facing seats around said front port and around the front end of the collar, respectively, said gasket being compressed between the sleeve and the collar, said collar having a passage connecting the charging port to the distribution port when the collar seat is not engaged with its related head seat, wrench engaging means on the sleeve backwardly of said opening for rotation of the sleeve, and wrench engaging means on the stem backwardly of the first-mentioned wrench engaging means, said head having an outer diameter less than that of said shoulder, so that the entire assembly may be inserted into the back end of said opening by rotation of the wrench engaging means of the sleeve.

2. A valve according to claim 1, wherein all threads are self-locking.

3. A valve according to claim 1, wherein the head seats engage the seats around the collar and the front port in line contact therewith.

4. A valve according to claim 1 wherein a cap is threaded on the back end of the body and compresses a sealing gasket thereagainst around said sleeve.

5. A valve according to claim 4 wherein the back end of the cap is provided with a wrench socket engageable with the wrench engaging means of the stem and wherein the cap has a segment formed and arranged to fracture if a torque force in excess of fifty inch pounds is applied to rotate the cap and stem.

6. In a refrigeration valve comprising a body having a front port, a back port, a charging port connected to the back port, and an opening from the back end of the body extending to the back port, a valve stem and seat assembly comprising a sleeve threaded into said opening, a sealing gasket slideably fitted in said opening in gas-tight engagement therewith, a collar in said opening having its front end seated against internal abutment means on said body at the front of said back port, said assembly also comprising a valve stem in threaded engagement with the interior of said sleeve and having an unthreaded portion slideably fitted in the gasket in gas-tight engagement with its inner diameter, said stem extending through the collar and having a head with oppositely facing seats engageable alternatively with mutually facing seats around said front port and around the front end of the collar, respectively, said gasket being compressed between the sleeve and the collar, said collar having a passage connecting the charging port to the back port, wrench engaging means on the sleeve backwardly of said body for rotation of the sleeve, and wrench engaging means on the stem, said head having an outer diameter less than the radial projection of said abutment means into said back port so that the entire assembly may be assembled into the back end of said opening by rotation of the sleeve wrench engaging means.

7. In a refrigeration valve, a valve body having front and back ports, a charging port and a distribution port, a valve stem assembly mounted within a cylindrical opening in said body, said opening extending from one end of the body to the back port, said assembly comprising a sleeve having its outer diameter in threaded engagement with the body in said opening, a collar, annular compressible sealing means compressed between said sleeve, said collar and said body, abutment means on said body in the back port, said collar releasably seated against said abutment means, a cylindrical valve stem extending through the sleeve, the abutment means and the collar and compressing the inner diameter of said sealing means, said stem having a head in said chamber, oppositely facing seats on said head, annular seats on the collar and body around the back and front ports, respectively, and formed and arranged for contact with respective seats of said head, and mating threads on the outer diameter of the stem and the inner diameter of the sleeve, said stem having means for actuation to urge said head seats alternatively against respective seats on said collar and body by rotation of the stem, the outer diameter of said head being less than the radial projection of said abutment means into said back port so that the assembly may be assembled through said opening, said collar having a passage connecting the charging port to the back port.

8. In a valve, the combination of a valve body having an internal port and having a sleeve extending from the port to the back end of the body, a valve stem having threaded engagement with the sleeve and having a head with a seat formed and arranged for line contact with a seat around the port, said stem having wrench engaging means, a cap removably mounted on said body and containing said means, and wrench means on said cap complementary to and engageable with said engaging means when the cap is removed from said body to rotate said stem for actuation of said head, said cap having a portion formed and arranged to fracture upon application of torque force in excess of a maximum torque force of up to 50 inch pounds.

* * * * *